United States Patent [19]

Makowski et al.

[11] Patent Number: 5,533,015
[45] Date of Patent: Jul. 2, 1996

[54] TRANSMISSION SYSTEM COMPRISING AT LEAST TWO SUBSCRIBER DEVICES EXCHANGING INFORMATION SIGNALS IN THE SIMPLEX OF HALF-DUPLEX MODE

[75] Inventors: Pierre Makowski, Prunay; Rémi Sfez, Saint Cloud; Yvon Guedes, Lannion, all of France

[73] Assignee: U.S. Philips Corporation, New York, N.Y.

[21] Appl. No.: 255,850

[22] Filed: Jun. 8, 1994

Related U.S. Application Data

[63] Continuation of Ser. No. 941,339, Sep. 4, 1992, abandoned.

[30] Foreign Application Priority Data

Sep. 11, 1991 [FR] France ................... 91 11211

[51] Int. Cl.$^6$ ........................................ H04J 3/06
[52] U.S. Cl. .............................. 370/31; 370/95.3
[58] Field of Search .................. 370/85.1, 85.2, 370/85.3, 24, 31, 29, 95.1, 45.3, 108, 105, 85.7, 94.1, 94.2, 60, 60.1, 58.1, 32, 36, 37, 40, 65.5, 66, 67, 68, 68.1, 69.1, 71, 76, 77, 85.6, 85.11, 95.2; 455/33.1–33.4, 38.3, 51.1, 14, 15, 54.1, 54.2, 56.1; 340/825.5, 825.51, 825.52

[56] References Cited

U.S. PATENT DOCUMENTS

| | | | |
|---|---|---|---|
| 4,564,838 | 1/1986 | Boulogne et al. | 370/85.2 |
| 4,625,308 | 11/1986 | Kim et al. | 370/95.5 |
| 5,091,906 | 2/1992 | Reed et al. | 370/31 |
| 5,164,942 | 11/1992 | Kamerman et al. | 370/94.1 |
| 5,212,684 | 5/1993 | MacNamee et al. | 370/24 |

FOREIGN PATENT DOCUMENTS

| | | |
|---|---|---|
| 480505 | 4/1992 | European Pat. Off. . |
| 2667747 | 4/1992 | France . |

OTHER PUBLICATIONS

International Switching Symposium, vol. II Mar. 1987, Phoenix (US) pp. 759–765; Robert et al: "Alctael Land Mobile System CD900 A Full Digital Cellular Approach Using Wideband TDMA".

39th IEEE Vehicular Echnology Conference, vol. 11, May 1989, San Francisco (US), pp. 712–717; A. Maloberti: "Radio Transmission Interface of the Digital Paneuropean Mobile System".

Primary Examiner—Douglas W. Olms
Assistant Examiner—Dang Ton
Attorney, Agent, or Firm—Michael E. Schmitt

[57] ABSTRACT

Transmission system comprising at least two subscriber devices exchanging information signals in the simplex mode. This transmission system comprises at least a remote and a near subscriber device (A1, B1) exchanging information signals in the simplex mode by means of a multiplex of the time-division type in which a control time interval is provided. For a communication between a remote subscriber and a near subscriber, a control time interval (XCCH) is allocated for the transmission of a request to speak made by one of the subscribers. The request to speak received by the other subscriber is used for preventing him from transmitting.

8 Claims, 2 Drawing Sheets

TRANSMISSION SYSTEM COMPRISING AT LEAST TWO SUBSCRIBER DEVICES EXCHANGING INFORMATION SIGNALS IN THE SIMPLEX OF HALF-DUPLEX MODE

This is a continuation of application Ser. No. 07/941,339, filed Sep. 4, 1992, now abandoned.

BACKGROUND OF THE INVENTION

The present invention relates to a transmission system comprising at least a remote and a near subscriber device exchanging information signals in the simplex mode by means of time-division multiplex signals in which control time intervals are provided.

The invention likewise relates to a subscriber device suitable for such a system.

A system of this type finds important applications, more specifically, when the connections are realised by radio channel.

A known system of this type is described in French Patent Application No. 2 667 747 filed Oct. 9, 1990 in the name of the Applicants. When these systems are used as private systems (as against public systems), the radio resources (reduced pass-band frequency channels) are spread parsimoniously. Therefore, the communications between two subscribers are effected in the alternate mode: that is to say, when one subscriber speaks, the other listens (e.g. with a push to talk switch).

The problem then posed is caused by the simultaneous request from two subscribers or more to speak. A risk of communication getting lost then arises.

SUMMARY OF THE INVENTION

In order to resolve this problem a system of the type mentioned in the opening paragraph is characterized, in that for a communication between a remote subscriber and a near subscriber a control time interval is allocated to the transmission of a request to transmit or speak made by one of the subscribers, and in that this request to transmit or speak received by the other subscriber is used for preventing him from transmitting.

The following description made with reference to the annexed drawings, all this given by way of non-limiting example, will make it better understood how the invention may be realised.

DESCRIPTION OF THE PREFERRED EMBODIMENT

Figure 1:
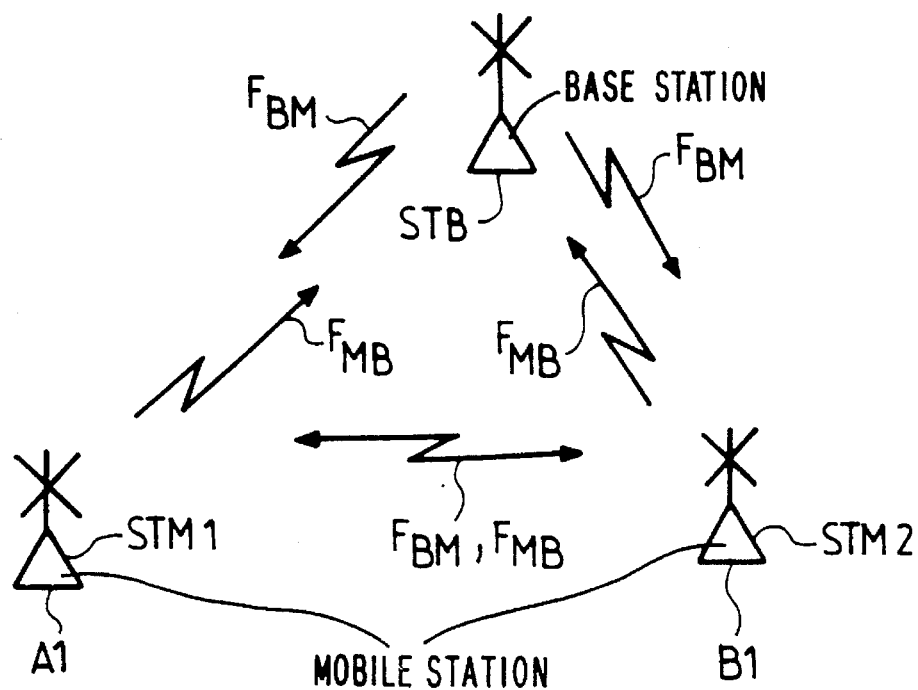
FIG. 1 shows a diagram of the transmission system.

FIG. 1 shows a system according to the invention. This system is formed by a set of transceiver stations STB, STM1 and STM2. Self-evidently, the number of stations may be arbitrary. STB is a transceiver base station, STM1 and STM2 are sub-stations, that is to say, managed by the base station. In practice the base station is a fixed station, whereas the stations STM1 and STM2 are portable stations or stations installed in vehicles. A subscriber device A1 is connected to the mobile station STM1 and a subscriber device B1 is connected to the mobile station STM2. The stations communicate among themselves by radio links which utilize two frequency channels $F_{BM}$ and $F_{MB}$.

In general, the channel $F_{BM}$ is used for the communications leading from the base station STB to the mobile stations STM1 and STM2 and the channel $F_{MB}$ for the communications leading from the mobile stations to the base station. The communications established over these frequency channels are organized in a time-division multiplex mode of the TDMA type.

Figure 2:
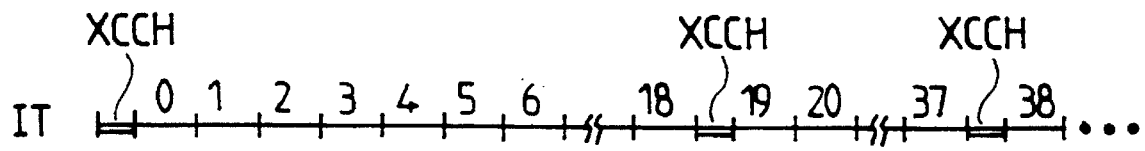
FIG. 2 shows the spreading of the control time intervals within a time-division multiplex.

FIG. 2 shows in a very schematic manner the organization of this multiplex. A series of time intervals IT numbered 0, 1, 2, ..., 37, 38, ... has been shown. These time intervals form common channels and are used for transmitting, for example, speech information. Other time intervals XCCH are inserted before the interval "0", between the intervals 18 and 19, ..., between the intervals 37 and 38, ..., etc. These time intervals may be allocated to different tasks for the organization of the multiplex. The intervals XCCH are used by the mobile stations, either for transmitting information signals during which period of time the frequency channel centred on the carrier $F_{MB}$ is used, or for receiving information signals during which period of time the frequency channel is then centred on $F_{BM}$.

Figure 3:
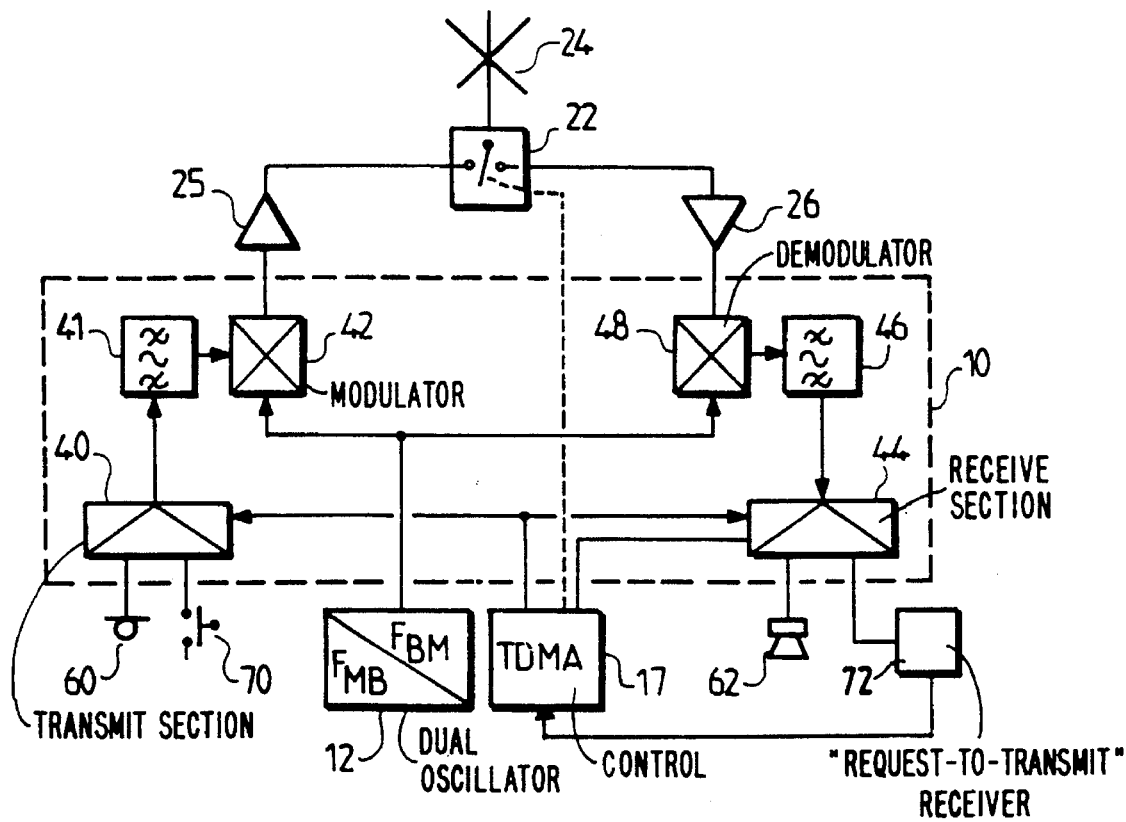
FIG. 3 shows the diagram of a subscriber coupling station.

FIG. 3 shows the diagram of the mobile stations STM1 and STM2 having identical structures.

Each station is constituted by a transceiver 10 controlled by a pair of reference oscillators 12 oscillating, respectively, at the frequencies $F_{MB}$ and $F_{BM}$. This set is adapted to a TDMA frame by means of a frame management circuit 17. A duplex switch 22 controlled by the control circuit 17 makes it possible via one and the same antenna 24 both to transmit at a frequency $F_{MB}$ and receive at a frequency $F_{BM}$ either or not different from $F_{MB}$. A transmit amplifier 25 and a receive amplifier 26 are connected to this switch 22.

The set 10 is formed by a transmit section 40 cooperating with a filter 41, centred at an intermediate frequency FI, and a modulator 42. The modulator 42 centres at the carrier frequency $F_{MB}$ the information signals produced by the section 40. The section 40 arranges the information signals to be transmitted in accordance with the commands given by the management circuit 17, phase-modulates, frequency-modulates or amplitude-modulates the information signals on an intermediate frequency FI. This management circuit 17 makes it also possible to recover the different information signals contained in the TDMA frame received by a receive set 44. The input of this set is connected to the output of a filter 46 centred at the frequency FI, connected to the output of a demodulator 48. This demodulator 48 receives from the amplifier 26 the signals supplied at the frequency $F_{BM}$. Reference numeral 60 denotes the subscriber's microphone and reference numeral 62 is his loudspeaker. The speech information, previously digitized, is transmitted in one of the time intervals of the frame transmitted by the carrier $F_{MB}$, this time interval being allocated by the management circuit 17. The speech information signals coming from the remote subscriber, transmitted in one of the time intervals of the frame transmitted at $F_{BM}$, are recovered at the loudspeaker after decoding. The management circuit 17 further operates so that all these XCCHs can be received.

According to the invention such a system comprises means for transmitting in a time interval XCCH a request to transmit or speak signal for a remote subscriber, means for detecting this request to transmit at the remote subscriber, and means for denying the remote subscriber access to transmission.

The means for transmitting the request to transmit may be realised by a simplex or "push-to-talk" button 70 connected to the section 40, in a time interval XCCH allocated to the connection of the near subscriber to the remote subscriber.

The means for detecting this request to transmit, at the remote subscriber, are constituted by the reception of the interval XCCH allocated to the communication, with the aid of a request-to-speak receiver 72 which influences the management circuit 17.

The means for denying access to transmission may be constituted by a luminous signal signalling to the remote subscriber that he cannot transmit speech because the management circuit 17 prevents this command, or also by the remote subscriber's device automatic change to the receive mode.

Figure 4:
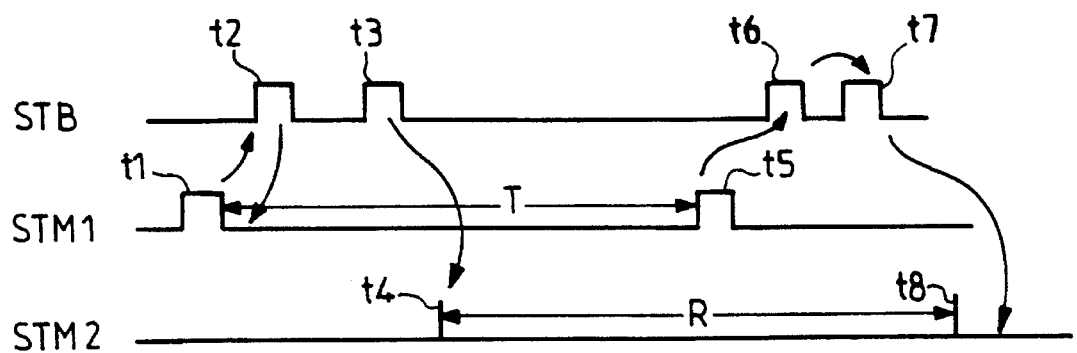
FIG. 4 shows the protocol of the simplex control.

FIG. 4 shows the procedure which permits the simplex communications in a satisfactory manner.

To begin with, an XCCH is assumed to be allocated by the station STB for the connection of subscriber A1 to subscriber B1.

At instant t1, by depressing the button 70, the subscriber A1 makes known to the station STB his request to transmit to the subscriber B1 in the interval XCCH.

At instant t2 the station STB, once it has verified that it is possible while avoiding conflicts of simultaneity, grants transmission priority to subscriber A1 by authorizing subscriber A1 to transmit. STM1 is put in position T (transmission as regards speech).

At instant t3 (which may overlap instant t2) STB transmits this request to the station STM2, thereby denying STM2 access to transmission.

At instant t4 the station STM2 has received this signal, which brings the station the receive position R.

At instant t5 the subscriber A1 releases his simplex button, thereby causing transmission of a release signal to station STB.

At instant t6 the station STB acknowledges reception of this release signal to station STM1.

At instant t7 (which may overlap instant t6) the station STB transmits a cancellation of transmission denial to station STM2, and thereby removes any obstacles for the station STM2.

This procedure may be further simplified as required, for example, by cancelling the instant t2, t5, t6, t7. In that case one the transmission priority is given to the last transmitter (t1, t3, t4).

We claim:

1. A first subscriber device for communicating over a transmission system comprising a base station and at least a second subscriber device and another subscriber device, wherein said first and second subscriber devices exchange information signals in a simplex mode using time division multiplex signals, said time division multiplex signals including spaced control time intervals, and one of said control time intervals being allocated for a request to transmit by said first subscriber device, characterized in that said first subscriber device comprises means for detecting said one of said control time intervals, means for enabling a subscriber using said first subscriber device to obtain transmission priority for transmitting information to said another subscriber device, said means for enabling including means for generating a first request to transmit signal; means, responsive to said means for detecting, for transmitting said first request to transmit signal during said one of said control time intervals; and means, responsive to receipt of a first control signal from said base station, for enabling transmission of said information to said another subscriber device, and means, responsive to completion of transmission of said information, for transmitting a release signal.

2. A first subscriber device as claimed in claim 1, comprising means responsive to receipt, during one of said control time intervals, of a second control signal from said base station relating to a request to transmit signal from said second subscriber device seeking to communicate information to said first subscriber device, for preventing transmission by said first subscriber device prior to receipt of a release signal from said second subscriber device.

3. A device as claimed in claim 1, characterized in that said first subscriber device is a speech signal transceiver having a push-to-talk switch, said means for generating is responsive to actuation of said push-to-talk switch, and said means for transmitting a release signal is responsive to release of said push-to-talk switch.

4. A method of operating a transmission system comprising a base station and at least a first subscriber device and a second subscriber device, wherein said devices exchange information signals in a simplex mode over a common channel of a time division multiplex system, wherein said time division multiplex system further includes spaced control time intervals, and wherein said method comprises allocating one of said control time intervals by said base station for managing said common channel, characterized in that said method further comprises:

permitting transmission of a request to transmit from said first subscriber device to said base station during said one of said control time intervals, responsive to completion of a transmission of said information signals from said first subscriber device over said common channel, transmitting a release signal from said first subscriber device during another of said control time intervals, and responsive to receipt by said base station of said request to transmit, transmitting from said base station at least one control signal for permitting said first subscriber device to transmit and for preventing said second subscriber device from transmitting until receipt by said second subscriber device of a signal indicative of the release by said first subscriber device.

5. A method as claimed in claim 4, wherein said first subscriber device is a speech communication device having a push-to-talk switch, characterized in that said release signal is transmitted responsive to release of said push-to-talk switch.

6. A method as claimed in claim 5, characterized in that said request to transmit is transmitted responsive to actuation of said push-to-talk switch.

7. A method as claimed in claim 4, characterized in that said one of said control time intervals is allocated to said first subscriber device by said base station.

8. A method as claimed in claim 4, characterized in that, responsive to receipt of said request to transmit, said base station transmits to said first subscriber device a first signal authorizing said first subscriber device to transmit, and transmits to said second subscriber device a signal corresponding to said request to transmit; and responsive to receipt of said release signal, said base station transmits to said second subscriber device a signal corresponding to said release signal.

* * * * *